United States Patent
Scott, II et al.

(10) Patent No.: US 10,739,864 B2
(45) Date of Patent: Aug. 11, 2020

(54) AIR WRITING TO SPEECH SYSTEM USING GESTURE AND WRIST ANGLE ORIENTATION FOR SYNTHESIZED SPEECH MODULATION

(71) Applicant: International Business Machines Corporation, Armonk, NY (US)

(72) Inventors: Willie L. Scott, II, Austin, TX (US); Charu Pandhi, Round Rock, TX (US); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/236,724

(22) Filed: Dec. 31, 2018

(65) Prior Publication Data

US 2020/0209976 A1    Jul. 2, 2020

(51) Int. Cl.
*G06F 3/01* (2006.01)
*G10L 13/04* (2013.01)

(52) U.S. Cl.
CPC .............. *G06F 3/017* (2013.01); *G06F 3/014* (2013.01); *G10L 13/043* (2013.01)

(58) Field of Classification Search
CPC ....... G06F 3/017; G06F 3/014; G10L 13/043; G06K 9/00355
See application file for complete search history.

(56) References Cited

U.S. PATENT DOCUMENTS 6,549,887 B1    4/2003  Ando et al.
9,355,236 B1 *  5/2016  Kratz ..................... G06F 21/32
9,865,250 B1    1/2018  Korn
9,868,449 B1 *  1/2018  Holz ...................... B60W 50/10
10,026,393 B2   7/2018  Christian et al.
10,319,352 B2 * 6/2019  Kar ...................... G10H 1/0008

(Continued)

FOREIGN PATENT DOCUMENTS

WO    2008069519 A1    6/2008
WO    2015088980 A1    6/2015

OTHER PUBLICATIONS

Greenfield, R., "The Forces Pushing Deaf Kids Away From Sign Language", https://www.theatlantic.com/technology/archive/2011/07/forces-pushing-deaf-kids-away-sign-language/353340/, Jul. 27, 2011, Accessed on Dec. 14, 2018, 4 pages.

(Continued)

*Primary Examiner* — Sardis F Azongha
(74) *Attorney, Agent, or Firm* — Scully, Scott, Murphy & Presser P.C

(57) ABSTRACT

A gesture to speech conversion device may receive indications of user gestures via at least one sensor, the indications identifying movement in three dimensions. A 2-dimensional (2D) plane on which a beginning of the movement and an end of the movement is substantially planar and a third dimension orthogonal to the 2D plane may be determined. A change of the movement in a direction of the third dimension in a course of the movement occurring on the 2D plane is detected. The change of the movement in the third dimension is mapped to an emphasis in the movement. The movement is transformed into speech with emphasis on a part of the speech corresponding to a part of the movement having the detected change.

20 Claims, 5 Drawing Sheets

(56) References Cited

U.S. PATENT DOCUMENTS

| | | | |
|---|---|---|---|
| 2009/0082045 A1 | 3/2009 | Mitchell et al. | |
| 2009/0315740 A1* | 12/2009 | Hildreth | G06F 3/017 |
| | | | 341/20 |
| 2011/0041100 A1* | 2/2011 | Boillot | G06F 3/011 |
| | | | 715/863 |
| 2011/0305398 A1* | 12/2011 | Sakakibara | G06K 9/00355 |
| | | | 382/203 |
| 2013/0069867 A1* | 3/2013 | Watanabe | G06F 3/017 |
| | | | 345/156 |
| 2014/0368434 A1* | 12/2014 | Paek | G06F 3/017 |
| | | | 345/168 |
| 2015/0242113 A1* | 8/2015 | Nguyen Thien | G06F 3/016 |
| | | | 345/173 |
| 2015/0261301 A1* | 9/2015 | Hagiwara | G06F 3/017 |
| | | | 715/268 |
| 2016/0147307 A1* | 5/2016 | Masuko | G06F 40/242 |
| | | | 715/863 |
| 2016/0154469 A1* | 6/2016 | Zhao | G06F 3/017 |
| | | | 345/158 |
| 2016/0203362 A1 | 7/2016 | Huang et al. | |
| 2017/0322633 A1 | 11/2017 | Shen et al. | |
| 2019/0362562 A1* | 11/2019 | Benson | G06F 3/017 |

OTHER PUBLICATIONS

Xu, C., et al., "Finger-writing with Smartwatch: A Case for Finger and Hand Gesture Recognition using Smartwatch", HotMobile '15, Feb. 12-13, 2015, 6 pages.

Kumar, P., et al., "Real-Time Recognition of Sign Language Gestures and Air-Writing using Leap Motion", 2017 Fifteenth IAPR International Conference on Machine Vision Applications (MVA), May 8-12, 2017, pp. 157-160.

Progressive Phonics, Co., "Capital Letters—Air Writing", http://www.progressivephonics.com/alphabet/capital-letters/221-air-writing, Accessed on Dec. 14, 2018, 4 pages.

Youtube, "SpeechBubbles: Enhancing Captioning Experiences for Deaf and Hard-of-Hearing People in Group Conversations", https://www.youtube.com/watch?v=7OSlbnZHvPU, Accessed on Dec. 14, 2018, 2 pages.

Price, M., "The 5 Best AAC Devices (Augmentative and Alternative Communication)", https://www.rehabmart.com/post/the-5-best-aac-devices-augmentative-and-alternative-communication-product-reviews-and-rating, Accessed on Dec. 14, 2018, 38 pages.

Peng, Y.-H., et al., "SpeechBubbles: Enhancing Captioning Experiences for Deaf and Hard-of-Hearing People in Group Conversations", CHI 2018, Apr. 21-26, 2018, pp. 1-10, Paper 293.

* cited by examiner

AIR WRITING TO SPEECH SYSTEM USING GESTURE AND WRIST ANGLE ORIENTATION FOR SYNTHESIZED SPEECH MODULATION

BACKGROUND

The present application relates generally to computers and computer applications, computer-implemented gesture identification, speech to text conversion, speech synthesis and more particularly to recognizing language written in the air via gesture.

Air writing uses hand and finger fitted sensors such as accelerometers to detect writing gesture or movement in air. Computer vision techniques can also recognize hand gestures, for example, made in air. Text-to-speech techniques synthesize text into speech. Optical character recognition techniques can convert images to machine encoded text. Techniques exist, which given a detected trajectory of "a pen", can accurately recognize the character "written by the pen."

Hand gesture communication such communicating in sign language require individuals to learn a separate language, a sign language, for instance, in addition to knowing written language. The present disclose in embodiments proposes air writing with ability to communicate emphasis in the communication, for example, which can facilitate conveying intended context of the communication.

BRIEF SUMMARY

A system and method of transforming air writing to speech may be provided. A system, in one aspect, may include a hardware processor communicatively coupled to at least one sensor, the at least one sensor operable to detect user gestures. The hardware processor may be operable to receive indications of user gestures via the at least one sensor, the indications identifying movement in three dimensions. The hardware processor may be also operable to determine a 2-dimensional (2D) plane on which a beginning of the movement and an end of the movement is substantially planar. The hardware processor may be also operable to determine a third dimension substantially orthogonal to the 2D plane. The hardware processor may be also operable to determine a change of the movement in a direction of the third dimension in a course of the movement occurring on the 2D plane. The hardware processor may be also operable to map the change of the movement in the third dimension to an emphasis in the movement. The hardware processor may be also operable to transform the movement into speech with emphasis on a part of the speech corresponding to a part of the movement having the detected change.

A method, in one aspect, may include receiving indications of user gestures via at least one sensor, the indications identifying movement in three dimensions. The method may also include determining a 2-dimensional (2D) plane on which a beginning of the movement and an end of the movement is substantially planar. The method may also include determining a third dimension substantially orthogonal to the 2D plane. The method may also include determining a change of the movement in a direction of the third dimension in a course of the movement occurring on the 2D plane. The method may also include mapping the change of the movement in the third dimension to an emphasis in the movement. The method may also include transforming the movement into speech with emphasis on a part of the speech corresponding to a part of the movement having the detected change.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
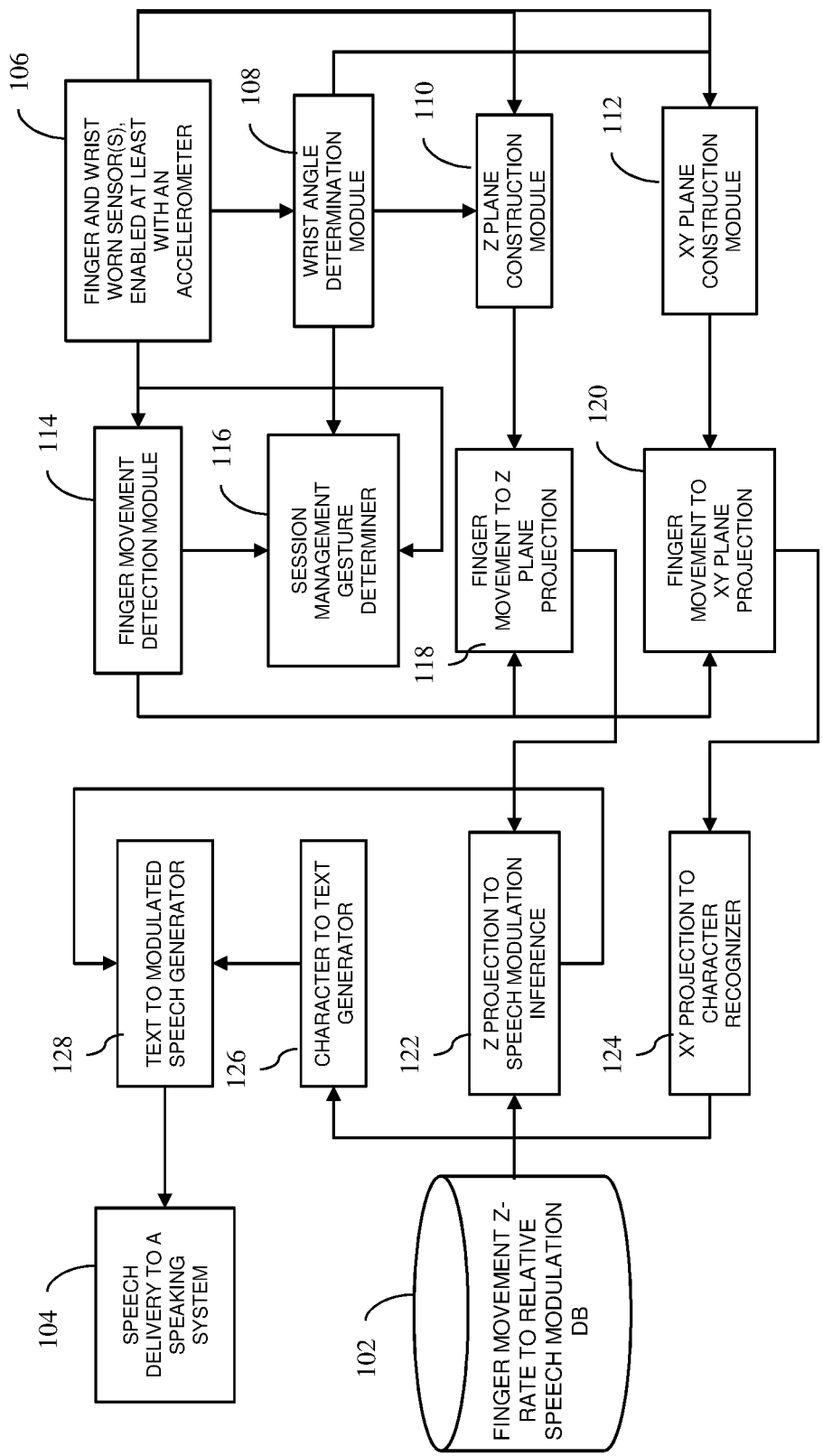
FIG. 1 is a diagram illustrating system architecture in the present disclosure according to one embodiment.

A system, method and technique are presented, which can recognize writing in the air in the standard language, using multi-dimensional (e.g., three) dimensional geometric shape, and particularly a dimension (e.g., the z-dimension) to detect emphasis on a word such as volume, tone, pitch, or another to synthesize speech.

For instance, the system, method and technique of the present disclosure allow a user to communicate in any standard language, for example, write letters in mid air. In this way, the user need not communicate in sign language, which may be difficult to learn. In one embodiment, the system and method use three dimensions and the geometry context arising from gestures and wrist movement, convert air writing of words into speech, where the z-dimension (e.g., depth information) is used for emphasis on a word. The emphasis can include inflection, volume, tone, pitch, and speed. For instance, depth-based modulation is used to sense emphasis.

In one aspect, a method of converting gestures to speech may be provided which uses three dimensions to determine speech and emphasis in the speech. For instance, indications of gestures from a user may be received wherein the indications identify the user's movement in three dimensions. The indications can be received from sensors attached to a hand (the user's hand). The gestures, for instance, are air writing of words. The identified movements are analyzed to determine a meaning of the gestures including an emphasis based on a geometry context. For instance, the depth perception of the different parts of the air-writing may be used. A synthesized voice (verbalized sound or speech) including the emphasis for the meaning is provided. The emphasis can be one or more of inflection, volume, tone, pitch, and speed.

A system, in one embodiment, carries out air-writing-to-speech based outgoing communication that mimics natural human speech by performing synthesized speech modulation by leveraging: session semantics with respect to each individual speech micro-session; wrist angle and/or writing angle orientation; and z-dimension (depth-dimension) projection geometry cues from the user to govern synthesized speech modulation.

Using z-dimension or depth dimension projection geometry in this context allows for synthesized speech modulation to simulate emphasis or other cues present naturally in human speech. Examples of these cues include, but are not limited to, inflection, volume, tone, pitch, speed, others.

In one embodiment, the system can be calibrated and can also be trained to understand what a specific user's z-index gesture or motion should map to for synthesized speech modulation. In one aspect, this gesture-based approach is language independent. For example, any language may work.

In some embodiments, sensors may be utilized which are equipped with accelerometers. In one embodiment of air-writing to speech with synthesized speech modulation, an air-writing system that performs a speech modulation may include using a single-sensor array of one or more sensors, for example, on or coupled to one or more fingers of a speaker or gesturer. In another embodiment, an air-writing system that performs speech modulation may include using a triple-sensor configuration, for example, wrist, palm or finger-up, and finger-near-the-tip sensors, coupled to a speaker or gesturer.

Air writing gestures for communication may be detected in sessions, for example, referred to as micro-sessions. A speech session or micro-session can begin with a configured start or begin gesture and end with a configured end gesture. In one embodiment, a micro-session management system, for example, running on a server (e.g., remote, or a portable server carried by the user) can be triggered by one or more sensors transmitting gestures, e.g., the finger movements to the server, wherein a micro-session is started at the detection of a reserved (e.g., pre-configured) gesture, e.g., recognized by the finger-worn sensors, and ended by another reserved (pre-configured) gesture.

A recognition of finger movements within the micro-session, invokes a character recognition module (which, for example, may perform similar functions as optical character recognition (OCR) enablers to recognize characters). The recognized characters are converted to words. The converted words are transformed to speech, which is spoken by a device logically configured with the sensors, such as an electrical portable loud speaker that an individual can carry around.

In a single-sensor configuration embodiment, each micro-session in starting speech modulation, may analyze a first few letters written in air (as sensed by a sensor) and finds an xy-plane (2-dimensional (2D)) projection to draw lines in a 3-dimensional (3D) space and passes the xy-plane to the character recognition system. The z-dimension projection over those few letters is also analyzed to understand the relative depth of the different parts of the writing. The z-depths and finger movement rates at the z-dimension are mapped to modulation levels and types. In one aspect, determining or understanding the relative depth ensures that other concurrent motions such as walking, driving, riding a car, or other motions that occur at the time of air writing do not affect the quality of accurately detecting the intended emphasis.

In a multi-sensor configuration embodiment, for example, triple-sensor configuration, the wrist angle may determine the xy-plane, which is passed to the character recognition system. The z-dimension depth or displacement may be determined using the relative distances between sensor layers, for example, the three sensor layers of wrist, palm or finger-up, and finger-near-the-tip, to detect the speech modulation requirements. In this embodiment, the speech modulation can start immediately (without delay) using the known mapping from z-dimension finger movements to speech modulation type and amount. In one embodiment, a micro-session can end with a gesture-based termination of a given session.

In one aspect, a micro-session can be started or triggered responsive to a preconfigured gesture being detected, or by a press-of-button, for example, manually by a user. In one aspect, a period calibration, involving finger orientation determination is carried out. For instance, in a multi-sensor configuration embodiment (e.g., a triple-sensor configuration), orientation can be determined via wrist angle determination by triangulation. For instance, the triangulation can be carried out via a determination of the angle of intersection of (a) the line drawn between the wrist to palm (or finger-up) sensor and (b) the line drawn between the palm (or finger-up) to the finger-near-the-tip sensor.

In a single sensor array embodiment, orientation can be determined after a micro-session is started. For example, after a first few letters are air-written, the xy-plane projection is determined at each instant (or at fixed intervals of time or distance of finger movement), using the top extreme corner of the writing at the left, bottom extreme corner of the writing at the right (of the final letter appearing within the limit of the "first few letters"), and one random or one heuristic point in the middle to draw or define the xy-plane.

Once the xy-plane is computed, the z-plane is computed as the orthogonal perpendicular to the XY plane. In a single sensor array embodiment, in one aspect, the creation of the z-dimension happens only after the threshold number of letters (or time or air-writing length) has passed since the starting or beginning of the writing process, which was used to determine the xy-plane. In one aspect, there may be a delayed start in modulation of speech (e.g., due to waiting for the threshold number of letters to be written), and a preconfigured modulation expression may be used until the learning gets sufficiently matured over the iterations.

In case of a multi-sensor embodiment, a triangulation can be carried out immediately at the beginning of a speech modulation process, e.g., at substantially the same time the xy-plane determination can be performed, and the z-dimension is also computed at substantially the same time, e.g., right after the beginning of the speech modulation process.

In one embodiment, the z-dimension projection of the finger movement during the air-writing process may be associated with speech modulation, by beforehand pre-creating a map (during learning of the system) of the movement to emotions and tones used in modulations in voices, for example, using human domain expert specifications and policies. The modulation may, in the runtime, look or search for the depth and suddenness ("acceleration") of the finger movement in the z-dimension.

During the time of operation (runtime), the z-dimension value, and finger movement rates at the z-dimension, can be used to fetch desired modulation levels and types. In one aspect, a relative depth based measurement is used, for example, relative depth of the user with respect to the writing can be measured. Measuring relative depth ensures that other concurrent motions such as walking, driving, riding a vehicle, or another, do not affect the air writing system's quality of detecting speech and/or speech emphasis.

The system and/or method of the present disclosure can provide for synthesized speech modulation via z-index. Air-writing to speech with synthesized speech modulation in the present disclosure in some embodiments can convey more information and deliver a richer communication experience. Consider the following example, whereby emphasis using speech modulation (simulated inflection) can be helpful in understanding the proper meaning:

"I did not say he lost the keys." (If not you, who said it?)
"I did not say he lost the keys." (Maybe you wrote it?)
"I did not say he lost the keys." (I guess someone else lost the keys.)
"I did not say he lost the keys." (Perhaps he gave them away?)
"I did not say he lost the keys." (I hope he did not lose the car!)

As shown in the above example, speech modulation by using air-writing z-index computations to emphasize specific elements of synthesized speech allows for providing additional context.

In some embodiments, a "speech assistance module" may map user-specified gestures or finger movements in the z-dimension to the expected modulation. A user may keep writing in the air via moving the fingers, and the movement data is collected on an ongoing basis by the finger-worn sensors. The text characters are detected, using a OCR-like computational method, from the finger-movement data as read by the finger-worn sensors (e.g., sensor's or sensors' projection on the xy-plane), the text character recognition method using existing modules to perform character recognition from a given shape, on a server's computation module. The characters are analyzed to obtain semantically meaningful words, e.g., using existing techniques of character-set-to-words methods. The determined text is converted to speech (e.g., modulated for emphasis or infection based on user cues provided by z-index), and is sent to a speech delivery module, for example, situated in the user's speaking device, which in turn is spoken out, and thus delivered, helping the user, such as a non-oral individual in communication ("speaking").

A system and method of the present disclosure in some embodiments can be implemented with sensors such as accelerometers, wireless communication technologies, optical character recognition modules or methods that can recognize characters from written text, and text-to-speech conversion techniques.

FIG. 1 is a diagram illustrating system architecture in the present disclosure according to one embodiment. A database 102 may store, for example, on a storage device, a mapping or map of z-dimension movements to relative speech modulation. For instance, different speed or rate of movement in the z direction or a depth or distance in the z direction, may be mapped to different levels or types of inflection. For example, the z-dimension movements are mapped to a relative speech modulation. In one aspect, a machine learning model can be trained to recognize and classify a gesture. The gesture classifications can be made by running the trained machine learning model and a mapping of each gesture classification to a speech modulation can be defined and persisted.

A speech delivery component 104, for example, may be a speaker or like device, which can be carried by a user, and delivers a voice or sound of modulated synthesized speech converted from an air writing session, to a user.

Functional components shown in FIG. 1 can be implemented as software or firmware or programmed hardware and can execute on one or more hardware processors. One or more sensors enabled at least with an accelerometer 106 may be worn by a user, for example, coupled to one or more of a user's finger tip, palm area, and wrist. A wrist angle determination module 108 detects and computes a user's wrist angle in air writing. This wrist angle determination module may activate, for example, in a case where multi-sensors are used in air writing, for example, where a sensor coupled to a user's wrist is present.

An xy-plane construction module 112 can take the computed wrist angle and determine the xy-plane on which an air-written text is detected. For instance, in one embodiment, the xy-plane can be determined using the writing behavior. In one embodiment, to determine the xy-plane, from the writing, the top extreme corner of the writing at the left, bottom extreme corner of the writing at the right (of the final letter appearing within the limit of the "threshold number of letters") and a random point along the plane of writing are chosen. For each point where the fingers are, the finger tips are localized, for example, using the wrist angle. For instance, the fingertips (writing points—the "pencil tip of writing" which is the finger tip in this example) can be localized using sensors on the fingers and an orientation of the wrist, and in turn these fingertip locations can create the points that are chosen downstream to determine the xy-plane.

The xy-plane construction module 112, may also determine the xy-plane, in case where a wrist angle is not available, e.g., in a single sensor embodiment, based on a threshold number characters written in air. For instance, responsive to a threshold number of letters being written in air (air-written), the xy-plane projection is determined at each instant (or at fixed intervals of time or distance of finger movement), using the top extreme corner of the writing at the left, bottom extreme corner of the writing at the right (of the final letter appearing within the limit of the "threshold number of letters"), and one random or one heuristic point in the middle to draw the XY plane. In one embodiment, the xy-plane is computed at the beginning of each air-writing micro-session, setting the initial, baseline position that subsequent air-written characters in the session are evaluated against for determining relative offset position.

A z-plane construction module 110 determines the z-plane as the orthogonal perpendicular to the xy-plane determined by the xy-plane construction module 112. In one aspect, the z-plane determined can be substantially orthogonal to the xy-plane.

A finger movement detection module 114 receives sensor data from one or more sensors 106 and detects movement. A session management gesture determiner 116 may receive sensor data from one or more sensors 106, finger movement data from the finger movement detection module 114, and/or a wrist angle data from the wrist angle determination module 108. The session management gesture determiner 116, for instance, based on one or more of the data received, can determine whether to begin an air-writing-to-speech-synthesis session, whether to end an air-writing-to-speech-synthesis session, for example, by comparing the received data with a preconfigured movement or gesture defined for indicating the start or termination of a session.

A finger movement to z-plane projection component 118 receives movement data (e.g., finger movement data) from the finger movement detection module 114 and the z-plane data from the z-plane construction module 110. The movement data may include x,y,z location coordinate of a location point of a user's finger tip (as sensed by a sensor) and the associated time the user's finger tip was located at that location point. As series of such data, in time series, may be received to represent the movement data. Based on the received movement data, and the z-plane, the finger movement to z-plane projection component 118 computes a projection of air writing in z-dimension (depth dimension). For instance, a distance or depth in the z-dimension direction is determined in the finger movement. A z projection to speech modulation inference component 122 receives the depth information from the finger movement to z-plane projection component 118, and correlates the depth information with level and/or type of emphasis in speech, example, by looking up the map or mapping stored in the database 102. In one aspect, the depth movement need not be completely perpendicular to the xy-plane, but may substantially follow the direction of the z-dimension. In one aspect, the z projection to speech modulation inference component 122 may include a machine learning model trained to classify gestures. A gesture can be classified by running the machine learning model, and the classified gestured may be mapped to speech modulation (e.g., emphasis).

A finger movement to xy-plane projection component 120 receives movement data (e.g., finger movement data) from the finger movement detection module 114 and the xy-plane data from the xy-plane construction module 112. The finger movement to xy-plane projection component 120 projects the movement data onto the xy-plane, for example, simulating a written text. The xy projection to character recognizer component 124 receives the projected xy-plane date from the finger movement to xy-plane projection component 120, and employs a character recognition technique such as the one used in optical character recognition (OCR) and determines characters written air. A character to text generator component 126 receives the recognized characters from the xy projection to character recognizer component 124 and generates text based on the received characters.

A text to modulated speech generator 128 receives the text generated by the character to text generator 126 and the speech modulation inference (speech emphasis) from the z projection to speech modulation inference component 122, and generates or synthesizes the text into voice or sound with emphasis placed in the areas of the text as determined by the z projection to speech modulation inference component 122.

The synthesized speech with appropriate emphasis is sent to a speech delivery system or speaker. The speaker projects the sound (speech with emphasis). In this way, for instance, a gesture based communication, for example, by air writing, can incorporate emphasis in the speech or communication as desired by a communicator.

Figure 2:
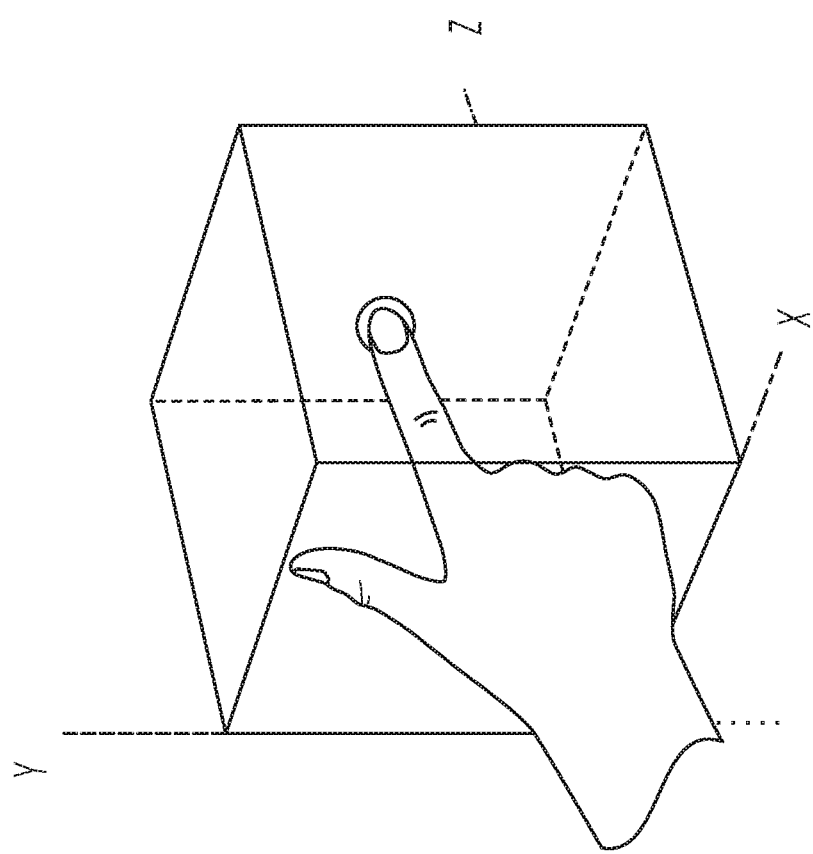
FIG. 2 is a diagram illustrating a 3-dimensional coordinate system, which incorporates a depth index (z-index) gesture in one embodiment.

FIG. 2 is a diagram illustrating a 3-dimensional coordinate system, which incorporates a depth index (z-index) gesture in one embodiment. Movement in the z-dimension direction can be determined and interpreted as emphasis on specific elements of air written speech. For instance, addition context can be added in synthesized speech from air-writing, by detecting and computing z-index or third dimensional component in air writing.

Figure 3:
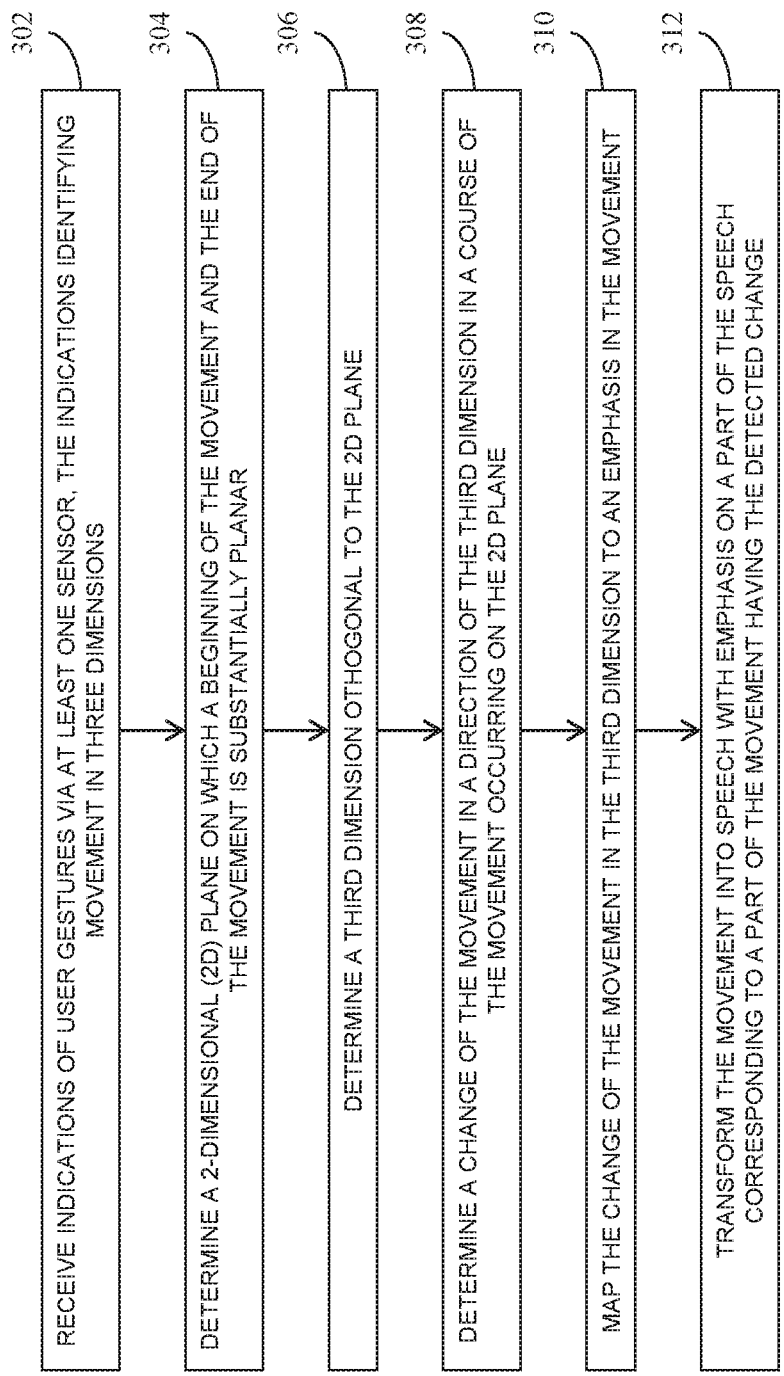
FIG. 3 is a flow diagram illustrating a method in the present disclosure according to one embodiment.

FIG. 3 is a flow diagram illustrating a method in the present disclosure according to one embodiment. A hardware processor communicatively coupled to at least one sensor operable to detect user gestures may perform the method. As described above, in one embodiment, there may be a single sensor. In another embodiment there may be multiple sensors, for example, three sensors making up a triple sensor system. Other numbers of sensors are possible. At 302, indications of user gestures are received via at least one sensor. The indications, for example, identify a movement or a series of movements (time series of movements) in three dimensions. For instance, the movement or a series of movements correspond to air writing of words.

At 304, a 2-dimensional (2D) plane (also referred to as a xy-plane) is determined on which a beginning of the movement and the end of the movement is substantially planar. In one aspect, the movement corresponds to air writing, wherein the beginning of the movement to the end of the movement correspond to writing in air on a virtual plane, the determined 2D plane. In an embodiment in which a single sensor is employed, a single sensor may be operable to be coupled to the user's finger tip. In this embodiment, for example, after a threshold number of letters or symbols are air-written, the xy-plane projection can be determined at each instant (or at fixed intervals of time or distance of movement (e.g., finger movement)), for example, using the top extreme corner of the writing at the left, bottom extreme corner of the writing at the right (of the final letter appearing within the limit of the "threshold number of letters or symbols"), and one random or one heuristic point in the middle to draw the xy-plane.

In another embodiment, for instance, in which multiple sensors are employed, a wrist angle of a user writing or gesturing in air can be detected by sensor data. In this embodiment, at least a first sensor may be operable to be coupled to the user's wrist, a second sensor may be operable to be coupled to the user's palm area, and a third sensor may be operable to be coupled to the user's finger tip. For instance, the 2D plane may be determined based on a positional angle of the user's wrist in making the movement, detected in the sensor data.

At 306, a third dimension that is orthogonal or perpendicular to the 2D plane is determined. The third dimension is also referred to as a z-dimension or depth dimension. In one aspect, the 2D plane and the third dimension may be calibrated periodically, for example, based on a new movement or a set of new movements.

At 308, a change in the movement moving or projecting in a direction of the third dimension in a course of movement occurring on the 2D plane (xy-plane) is detected. The change of the movement in the third dimension may be a change in speed or rate of the movement in moving in the direction of the third dimension. The change of the movement in the third dimension may be a change in a displacement in the third dimension. The change of the movement in the third dimension may be a change in a displacement and speed in the third dimension. The change of the movement in the direction of the third dimension may be determined relative to the user's current speed of movement.

At 310, the change of the movement in the third dimension is mapped to an emphasis in the movement. There may be different types and different levels of emphasis. Example of emphasis may include, but are not limited to, inflection, volume, tone, pitch, and speed, for example, in speech or speaking.

At 312, the movement is transformed into speech with emphasis on a part of the speech corresponding to a part of the movement having the detected change. For example, the movement is transformed into speech by performing a character recognition technique to recognize characters in the writing and generating text from the recognized characters. In one aspect, the transformed speech can be transmitted via a device such a speaker. For instance, the speech automatically spoken via a speaker device responsive to the hardware processor automatically performing transformation of the movement into speech. In one aspect, the hardware processor may automatically begin transforming the movement into the speech based on detecting a pre-configured user gesture, and automatically end transforming the movement into the speech based on detecting a pre-configured user gesture. In another aspect, beginning and ending of an air-writing to speech transformation session can be performed responsive to receiving a manual indication such as a manual trigger or push of a button.

A system, method and techniques in embodiment in the present disclosure allow air writing with ability to communicate emphasis in the communication, for example, which can facilitate conveying intended context of the communication. In one aspect, air writing system and method of the present disclosure is language independent. For instance, any written language may be employed to convey communication via air writing.

Figure 4:
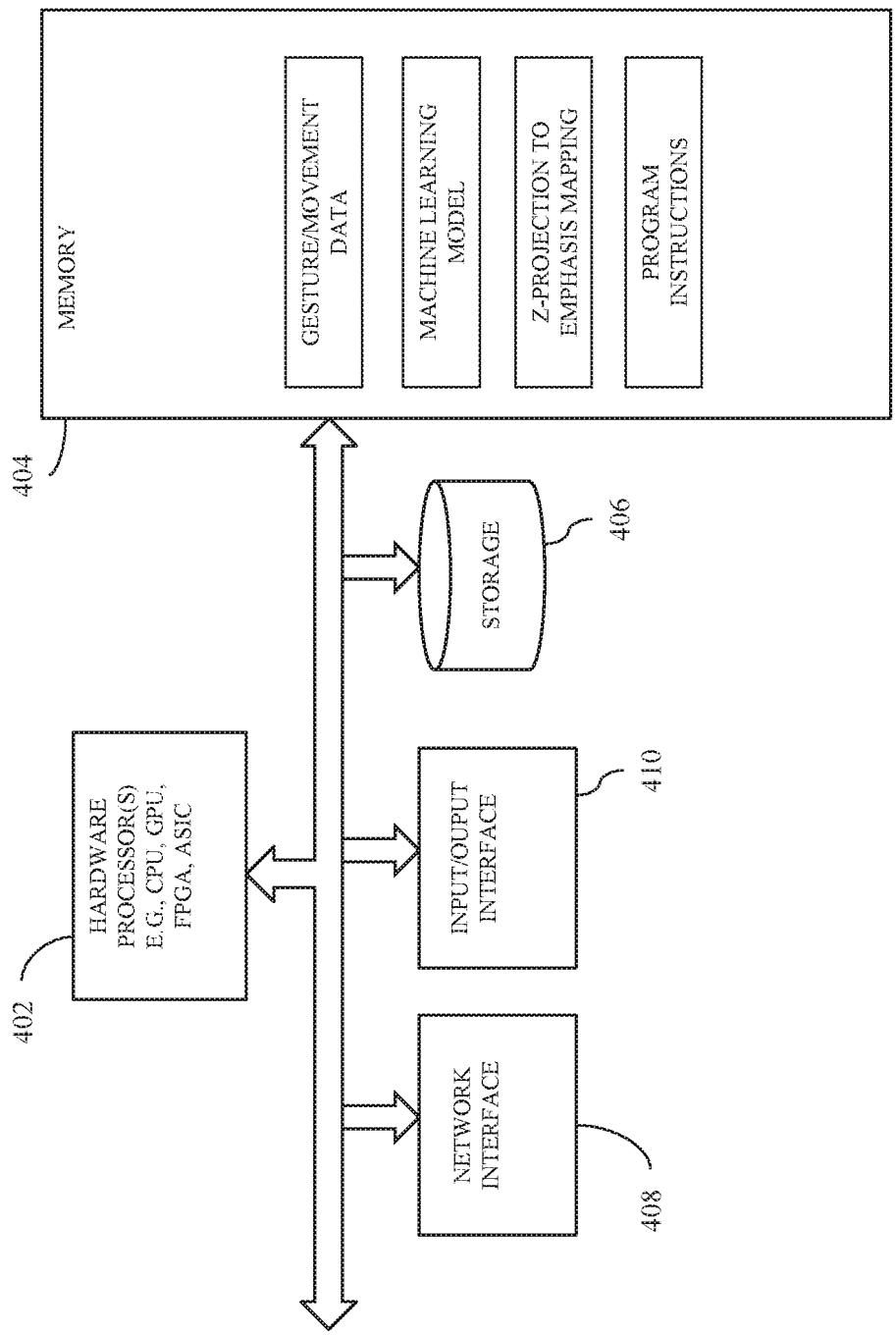
FIG. 4 is a diagram showing components of a system in one embodiment that transforms gestures in air into speech, for instance, with emphasis in parts of the speech.

FIG. 4 is a diagram showing components of a system in one embodiment that transforms gestures in air into speech, for instance, with proper emphasis in the parts of the speech as the gesturer intended. In this aspect, the gesturer may convey emphasis in parts of the communication by movement in the direction of a dedicated dimension. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and transform gestures detected by at least one sensor into speech or voice, audible sound. For instance, speech or voice synthesis is performed. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 404 may, for example, store instructions and/or data for functioning of one or more hardware processors 402, and may include an operating system and other program of instructions and/or data. One or more hardware processors 402 may receive input comprising movement data in three dimensions, for instance, detected by a sensor or a group of sensors. For instance, at least one hardware processor 402 may determine a 2-dimensional (2D) plane on which a beginning of the movement and an end of the movement is substantially planar, determine a third dimension orthogonal to the 2D plane, and determine a change of the movement in a direction of the third dimension in a course of the movement occurring on the 2D plane. At least one hardware processor 402 may also map the change of the movement in the third dimension to an emphasis in the movement and transform the movement into speech with emphasis on a part of the speech corresponding to a part of the movement having the detected change. In one aspect, mappings of a mapping of types and levels of emphases to projections of movements in the third dimension may be stored in a storage device 406 or received via a network interface 408 from a remote device, and may be temporarily loaded into the memory device 404 for transforming gestures with third dimension projections into speech with emphasis in parts of the speech. One or more hardware processors 402 may be coupled with interface devices such as a network interface 408 for communicating with remote systems, for example, via a network, and an input/output interface 410 for communicating with input and/or output devices such as a keyboard, mouse, display, and/or others. In one aspect, one or more hardware processors 402 may communicate with a sensor or group of sensor via a network interface 408, for example, such as a wireless network interface.

Figure 5:
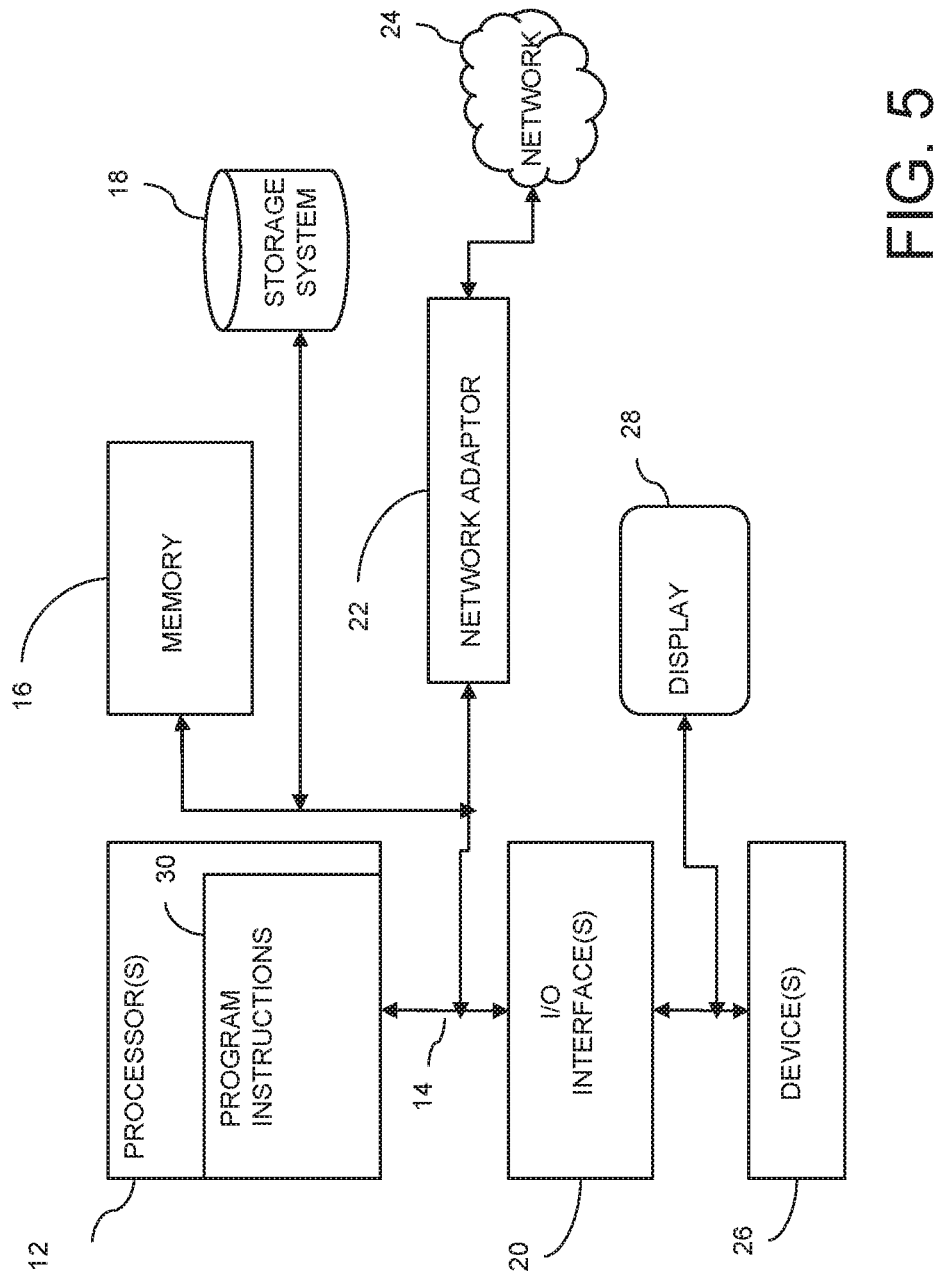
FIG. 5 illustrates a schematic of an example computer or processing system that may implement speech synthesis system in one embodiment of the present disclosure.

FIG. 5 illustrates a schematic of an example computer or processing system that may implement speech synthesis system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a hardware processor communicatively coupled to at least one sensor, the at least one sensor operable to detect user gestures, the hardware processor operable to at least:
receive indications of user gestures via the at least one sensor, the indications identifying movement in three dimensions;
determine a 2-dimensional (2D) plane on which a beginning of the movement and an end of the movement is substantially planar;
determine a third dimension substantially orthogonal to the 2D plane;
determine a change of the movement in a direction of the third dimension in a course of the movement occurring on the 2D plane;
map the change of the movement in the third dimension to an emphasis in the movement; and
transform the movement into speech with emphasis on a part of the speech corresponding to a part of the movement having the detected change.

2. The system of claim 1, wherein the movement corresponds to air writing, wherein the beginning of the movement to the end of the movement correspond to writing in air on a virtual plane comprising the 2D plane.

3. The system of claim 2, wherein the movement is transformed into speech by performing a character recognition technique to recognize characters in the air writing and generating text from the recognized characters.

4. The system of claim 1, wherein the change of the movement in the third dimension comprises a change in speed of the movement in moving in the direction of the third dimension.

5. The system of claim 1, wherein the change of the movement in the third dimension comprises a change in a displacement in the third dimension.

6. The system of claim 1, wherein the emphasis comprises at least one of inflection, volume, tone, pitch, and speed.

7. The system of claim 1, wherein the 2D plane and the third dimension are calibrated periodically based on a set of new movements.

8. The system of claim 1, wherein the change of the movement in the direction of the third dimension is determined relative to the user's current speed of movement.

9. The system of claim 1, wherein the at least one sensor comprises multiple sensors comprising at least a first sensor operable to be coupled to the user's wrist, and the 2D plane is determined based on a positional angle of the user's wrist in making the movement, detected by the sensor.

10. The system of claim 9, wherein the multiple sensors further comprise a second sensor operable to be coupled to the user's finger palm.

11. The system of claim 10 wherein the multiple sensors further comprise a third sensor operable to be coupled to the user's fingertip.

12. The system of claim 1, wherein the at least one sensor comprises a single sensor operable to be coupled to the user's fingertip.

13. The system of claim 1, wherein the speech is automatically spoken via a speaker device responsive to the hardware processor automatically performing transformation of the movement into speech.

14. The system of claim 1, wherein the hardware processor automatically begins transforming the movement into the speech based on detecting a pre-configured user gesture.

15. The system of claim 1, wherein the hardware processor automatically ends transforming the movement into the speech based on detecting a pre-configured user gesture.

16. The system of claim 1, further comprising a database storing a mapping of types and levels of emphases to projections of movements in the third dimension.

17. A method comprising:
receiving indications of user gestures via at least one sensor, the indications identifying movement in three dimensions;
determining a 2-dimensional (2D) plane on which a beginning of the movement and an end of the movement is substantially planar;
determining a third dimension substantially orthogonal to the 2D plane;
determining a change of the movement in a direction of the third dimension in a course of the movement occurring on the 2D plane;
mapping the change of the movement in the third dimension to an emphasis in the movement; and
transforming the movement into speech with emphasis on a part of the speech corresponding to a part of the movement having the detected change.

18. The method of claim 17, wherein the movement corresponds to air writing, wherein the beginning of the movement to the end of the movement correspond to writing in air on a virtual plane comprising the 2D plane.

19. A computer readable storage medium storing a program of instructions executable by a machine to perform a method comprising:
- receiving indications of user gestures via at least one sensor, the indications identifying movement in three dimensions;
- determining a 2-dimensional (2D) plane on which a beginning of the movement and an end of the movement is substantially planar;
- determining a third dimension substantially orthogonal to the 2D plane;
- determining a change of the movement in a direction of the third dimension in a course of the movement occurring on the 2D plane;
- mapping the change of the movement in the third dimension to an emphasis in the movement; and
- transforming the movement into speech with emphasis on a part of the speech corresponding to a part of the movement having the detected change.

20. The computer readable storage medium of claim 19, wherein the movement corresponds to air writing that conveys a communication, wherein the beginning of the movement to the end of the movement correspond to writing in air on a virtual plane comprising the 2D plane, and specific context of the communication can be conveyed by the movement projecting in the direction of the third dimension.

* * * * *